Patented Apr. 7, 1942

2,279,047

UNITED STATES PATENT OFFICE 2,279,047

RECLAMATION OF RUBBER

Walter G. Kirby and Leo E. Steinle, Naugatuck, Conn., assignors to United States Rubber Company, New York, N. Y., a corporation of New Jersey No Drawing. Application November 10, 1938, Serial No. 239,823

1 Claim. (Cl. 260—720)

This invention relates to the reclamation of vulcanized rubber fibre-containing waste such as rubber waste that would result from the manufacture of rubber shoes, clothing, hose, automobile tires, or other vulcanized rubber articles containing cellulosic fibres.

An object of the invention is to provide a means of accelerating the reactions taking place in the digester in the commonly used digester process. Another object is to provide an economy by means of shortening the processing time required by the digester process.

A further object is to provide a means of reducing the amount of softening oils required in the digester and thus produce an improved reclaim.

A further object is to provide a process obviating the use of oxygen-forming reagents which are relatively expensive and uneconomical to use where large volumes of oxygen are required and which also tend to introduce residues undesirable in the reclaim.

Still another object is to provide a method of preparing a low cost cellulose type reclaim using a shorter processing cycle and the complete elimination of caustic soda or acids from the digester.

A further object is to provide a method of preparing an improved reclaim suitable for use in rubber goods such as used on automobile running boards and in floor and auto mats where a low cost, non-nervy, flat milling reclaim is desired.

In order that this process may not be confused with other processes in which oxygen is employed as a plasticizing agent, it is pointed out that there are two principal methods of reclaiming scrap rubber. Each method employs entirely different types of apparatus. One of these is the "digester process" (sometimes called the alkali process) and the other the "heater process."

The digester process treats principally fibre-containing scrap in an apparatus known as a digester. In this process the scrap is digested in a solution (usually caustic soda) under heat and pressure until the fibre is destroyed and the rubber softened.

The "heater process" treats principally fibre-free scrap in an apparatus known as a heater (sometimes called devulcanizer). In this process the scrap is treated in boats or pans in a semi-dry state by the action of steam and pressure.

Our process claims an improvement in the so-called digester process.

In order to describe the present invention and point out in what respect it differs from known practice, one of the older processes will be described.

Old tires are ground or cut into pieces that will pass through a ½ or ¾ inch mesh screen. This scrap is then put into a steam jacketed digester. A usual charge is 6,000 pounds of scrap rubber, 600 pounds of caustic soda, 240 pounds of pine tar, 120 pounds of a low boiling point pine tar fraction and 12,000 pounds of water. The digester is sealed and steam at 150 pounds pressure per square inch is admitted to the jacket and this pressure maintained for from 18 to 24 hours. The digester is fitted with an agitator which keeps the contents in constant motion during the period of treatment. A constant temperature of around 365° F. is maintained. Through the combined action of the temperature, caustic and oils, the fibre in the scrap is gradually destroyed and the rubber gradually softened so that at the end of the processing period it is satisfactory to be washed, dried and milled. To aid in the softening, small percents of oxygen-forming reagents are sometimes used. The use of these is limited because of their relatively high cost per pound and the comparatively low selling price of the finished reclaim. Also when larger quantities of oxygen-forming reagents are used they tend to react to form a lime like residue which causes processing difficulties by the sealing up of outlet valves. The residue is also a detriment to the reclaim when carried through into same. Because of the cost and residue the use of oxygen-forming reagents much over ½ of one percent based on the weight of the scrap are not recommended, the preferred amount being $\frac{1}{10}$ to ⅓ of one percent.

We have found a manner of using larger volumes of oxygen avoiding the above disadvantages and that by introducing the same into a digester containing a charge similar to that mentioned above, that a satisfactory milling product may be obtained with a processing time of from 6 to 10 hrs. instead of from 18 to 24 hrs. If 200 pounds of steam pressure is used instead of 150 pounds per square inch the processing time will be from 4 to 6 hrs. instead of from 10 hrs. to 12 hrs. This produces a cellulose free type reclaim equivalent in quality but lower in cost than the usual 18 and 24 hour material at 150 pounds per square inch steam pressure or 10 to 12 hours at 200 pounds per square inch steam pressure.

We have also found that when larger volumes of oxygen are introduced into the digester, a cellulose type reclaim may be obtained in the shorter time period by eliminating all of the caustic soda. This creates a direct saving by eliminating the cost of the caustic and also eliminating the need of washing.

We have also found that through proper manipulation air may be used as an economical means of introducing the required oxygen into the digester. Such manipulation requires that steam be not introduced with the air because this would necessitate periodic venting and reduce the effectiveness of the air. By heating the mass entirely externally this is avoided. Also agitation of the mass is necessary to continuously expose new surfaces of the scrap to the action of the air.

In contradistinction from the older practice, one preferred method of procedure for our invention to produce a fibre free reclaim is as follows:

Rubber scrap such as old auto tires are debeaded, then cracked or crushed to pass through a ½ inch mesh screen. A charge consisting of 100 parts of scrap, 10 parts of caustic soda, 4 parts of pine tar, 2 parts of a low boiling point pine tar fraction and 200 parts of water are put into the inner chamber of a jacketed digester. The digester is closed and with the agitator revolving, air under pressure is introduced by means of suitable connections into the interior of the container and in contact with the rubber mix until the pressure gauge registers at least one atmosphere air pressure and preferably about four atmospheres air pressure corresponding respectively to about 2 and about 5 atmospheres absolute. Then the steam is fed into the outer jacket of the digester and the rubber mix infused with air is heated to a temperature corresponding to about 150 pounds per square inch or more steam pressure preferably to a temperature ranging from about 360 to 370° F. Heating is continued until the fibre is substantially destroyed and the rubber suitably softened by the combined action of air, heat and oils and where caustic or acid are present with the aid of such agents. The heating time varies from 6 to 10 hrs. depending on the nature of the scrap. Unless the air pressure exceeds the minimum indicated, and the proper temperature and conditions obtained, the reaction with the fibre and the softening of the rubber is but partial. The stock may then be washed as usual and dried and made ready for the mill room.

During the reaction between the air and fibre, gases are formed which substantially increase the internal pressure in case of acid but not in case of alkali stocks. Apparently carbon dioxide is formed during the reaction between air and fibre which in case of alkali stocks reacts again to form soluble salts with substantially no increase in internal pressure. In both cases, however, the temperature remains at that representing the steam pressure in the outer jacket.

If a flat milling cellulose-type reclaim is desired the procedure would be the same as the foregoing except the caustic or acid would be entirely eliminated.

A lower oil content reclaim, preferred for certain uses, can be prepared by following the first procedure except eliminating part of the oils and increasing the processing time to from 10 to 14 hrs.

Having thus described our invention, what we claim and desire to protect by Letters Patent is:

An alkali digestion process of reclaiming fibre-containing vulcanized rubber scrap to produce directly in one operation in shortened time, a softened substantially cellulose-free reclaim which comprises disposing in a jacketed digester a charge of comminuted fibre-containing vulcanized rubber scrap in admixture with alkali, a rubber softening agent, and a substantial volume of water, subjecting the mix to mechanical agitation and to the action of a large volume of air introduced into the digester under a gauge pressure of from 1 to 4 atmospheres, and exteriorly heating the mix at a temperature corresponding to from 150–200 pounds per square inch steam pressure in the jacket of the digester, while continuing the agitation of the mix to expose new surfaces of the scrap to the action of the air, until the rubber is softened by the combined action of air, heat, alkali, and rubber softener and the fibre substantially destroyed.

WALTER G. KIRBY.
LEO E. STEINLE.